United States Patent
Burns et al.

(10) Patent No.: US 10,045,485 B2
(45) Date of Patent: Aug. 14, 2018

(54) LAWN CARE VEHICLE BRAKE SYSTEM

(71) Applicant: HUSQVARNA AB, Huskvarna (SE)

(72) Inventors: Duncan Burns, Charlotte, NC (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/308,419

(22) PCT Filed: May 8, 2014

(86) PCT No.: PCT/EP2014/059493
§ 371 (c)(1),
(2) Date: Nov. 2, 2016

(87) PCT Pub. No.: WO2015/169381
PCT Pub. Date: Nov. 12, 2015

(65) Prior Publication Data
US 2017/0086376 A1    Mar. 30, 2017

(51) Int. Cl.
| | | |
|---|---|---|
| A01D 34/64 | (2006.01) | |
| A01D 69/10 | (2006.01) | |
| A01D 101/00 | (2006.01) | |

(52) U.S. Cl.
CPC ............ *A01D 69/10* (2013.01); *A01D 34/64* (2013.01); *A01D 2101/00* (2013.01)

(58) Field of Classification Search
CPC .... A01D 69/10; A01D 34/64; A01D 2101/00; A01D 2034/6843; B62D 11/006
See application file for complete search history.

(56) References Cited

U.S. PATENT DOCUMENTS

| | | | |
|---|---|---|---|
| 6,434,917 B1 | 8/2002 | Bartel | |
| 6,530,200 B1 * | 3/2003 | Minoura | A01D 34/64 56/15.2 |

(Continued)

FOREIGN PATENT DOCUMENTS

EP    2721916 A1    4/2014

OTHER PUBLICATIONS

International Search Report and Written Opinion for International Application No. PCT/EP2014/059493 dated Jan. 20, 2015, all enclosed pages cited.

(Continued)

*Primary Examiner* — Thomas W Irvin
(74) *Attorney, Agent, or Firm* — McNair Law Firm, P.A.

(57) ABSTRACT

A riding lawn care vehicle (10) may include a frame (60), a steering assembly (30), a brake assembly (110), and a mechanical brake linkage assembly (120). At least a first drive wheel and a second drive wheel (32) of the riding lawn care vehicle may be attachable to the frame. The steering assembly may include a first steering lever and a second steering lever (34), where the first and second steering levers are operably coupled to the first and second drive wheels respectively to facilitate turning of the riding lawn care vehicle based on drive speed control of the first and second drive wheels responsive to positioning of the first and second steering levers. The brake assembly may be operably coupled to the first and second drive wheels to enable brakes to be selectively applied to the first and second drive wheels. The mechanical brake linkage assembly may be configured to activate the brake assembly relative to the first and second drive wheels in response to one of the first steering lever or the second steering lever being moved outwardly to an outboard position independent of a position of the other of the first steering lever or the second steering lever.

14 Claims, 9 Drawing Sheets

(56) References Cited

U.S. PATENT DOCUMENTS

| | | |
|---|---|---|
| 6,708,805 B2 | 3/2004 | Samejima et al. |
| 6,729,115 B2 | 5/2004 | Bartel |
| 6,848,532 B2 | 2/2005 | Korthals |
| 7,677,371 B2 * | 3/2010 | Dong ................ A01D 69/10 188/350 |
| 8,240,420 B1 | 8/2012 | Bartel et al. |
| 9,173,346 B2 * | 11/2015 | Koike ................ A01D 34/78 |
| 2006/0174601 A1 | 8/2006 | Piontek |
| 2007/0068711 A1 | 3/2007 | Adkins et al. |
| 2013/0019707 A1 | 1/2013 | Ebihara et al. |
| 2017/0113721 A1 * | 4/2017 | Slegelis ................ B60T 7/102 |

OTHER PUBLICATIONS

International Preliminary Report on Patentability for International Application No. PCT/EP2014/059493 dated Nov. 8, 2016, all enclosed pages cited.

* cited by examiner

LAWN CARE VEHICLE BRAKE SYSTEM

TECHNICAL FIELD

Example embodiments generally relate to lawn care vehicles and, more particularly, to brake systems (e.g., parking brake systems) for riding lawn care vehicles.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some mowers have been provided with very short (e.g., near zero) turning radiuses. Such mowers have employed separate steering levers that interface with the drive wheels on each respective side of the mower.

BRIEF SUMMARY OF SOME EXAMPLES

Some example embodiments of the present invention provide steering levers on a riding lawn care vehicle that are movable to an outboard position to activate a brake assembly. However, rather than having the steering lever on each side activate only a corresponding brake assembly on that side, some example embodiments may provide for an assembly that enables only one (e.g., either one) of the steering levers to be moved to the outboard position to activate the brake assembly on both wheels without requiring movement of the steering lever on the other side.

In one example embodiment, a riding lawn care vehicle is provided. The riding lawn care vehicle may include a frame, a steering assembly, a brake assembly, and a mechanical brake linkage assembly. At least a first drive wheel and a second drive wheel of the riding lawn care vehicle may be attachable to the frame. The steering assembly may include a first steering lever and a second steering lever, where the first and second steering levers are operably coupled to the first and second drive wheels respectively to facilitate turning of the riding lawn care vehicle based on drive speed control of the first and second drive wheels responsive to positioning of the first and second steering levers. The brake assembly may be operably coupled to the first and second drive wheels to enable brakes to be selectively applied to the first and second drive wheels. The mechanical brake linkage assembly may be configured to activate the brake assembly relative to the first and second drive wheels in response to one of the first steering lever or the second steering lever being moved outwardly to an outboard position independent of a position of the other of the first steering lever or the second steering lever.

In another example embodiment, a mechanical brake linkage assembly of a riding lawn care vehicle is provided. The riding lawn care vehicle may further include first and second drive wheels, first and second steering levers, and a brake assembly. The brake assembly may be operably coupled to the first and second drive wheels to enable brakes to be selectively applied to the first and second drive wheels. The first steering lever may be operably coupled to the first drive wheel, and the second steering lever may be operably coupled to the second drive wheel. The riding lawn care vehicle may be steerable via the first and second steering levers to facilitate turning of the riding lawn care vehicle based on drive speed control of the first and second drive wheels responsive to positioning of the first and second steering levers. The mechanical brake linkage assembly may be operably coupled to the brake assembly and be configured to activate the brake assembly relative to the first and second drive wheels in response to one of the first steering lever or the second steering lever being moved outwardly to an outboard position independent of a position of the other of the first steering lever or the second steering lever.

Some example embodiments may improve an operator's ability to apply the brakes of a lawn care vehicle for starting, dismounting, and/or transporting the vehicle. The user experience associated with operating and transporting the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1A:
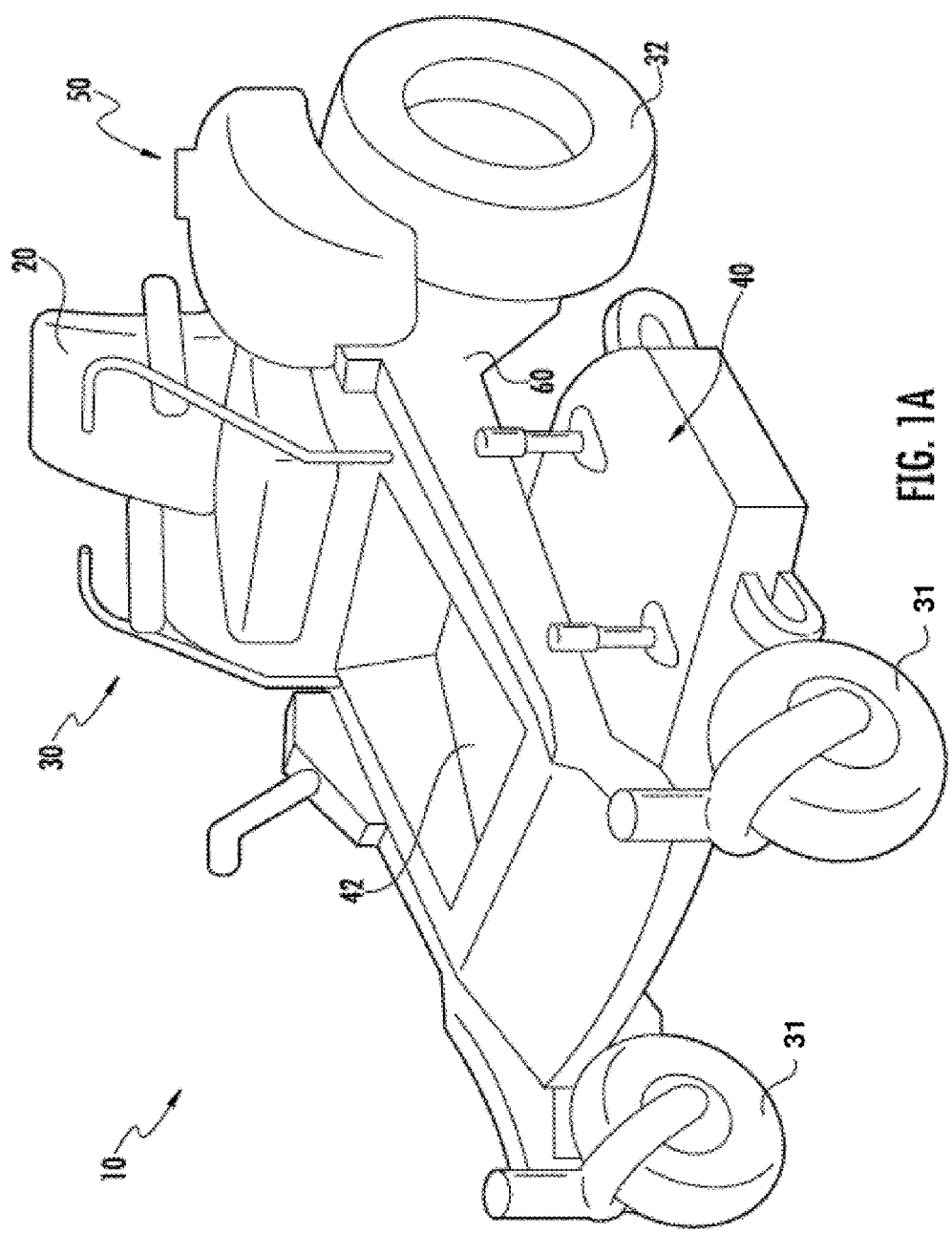
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to apply, engage, actuate, and/or otherwise activate brakes of lawn care vehicles such as, for example, riding lawn mowers. In this regard, some example embodiments may provide a steering assembly and mechanical brake linkage for use on a lawn care vehicle to apply brakes to both drive wheels by moving a single steering lever outboard. The brakes may therefore be easily applied to facilitate dismounting, transporting, and/or starting of the vehicle while applying, for example, the parking brake. Example embodiments may provide a physical link between the steering levers and the parking brake, but furthermore may provide such physical link in a manner that allows a single linkage assembly to independently be operable from either steering lever to activate the brakes. Separate brake levers and separate operations to activate each brake to a corresponding drive wheel may therefore be avoided.

Figure 1B:
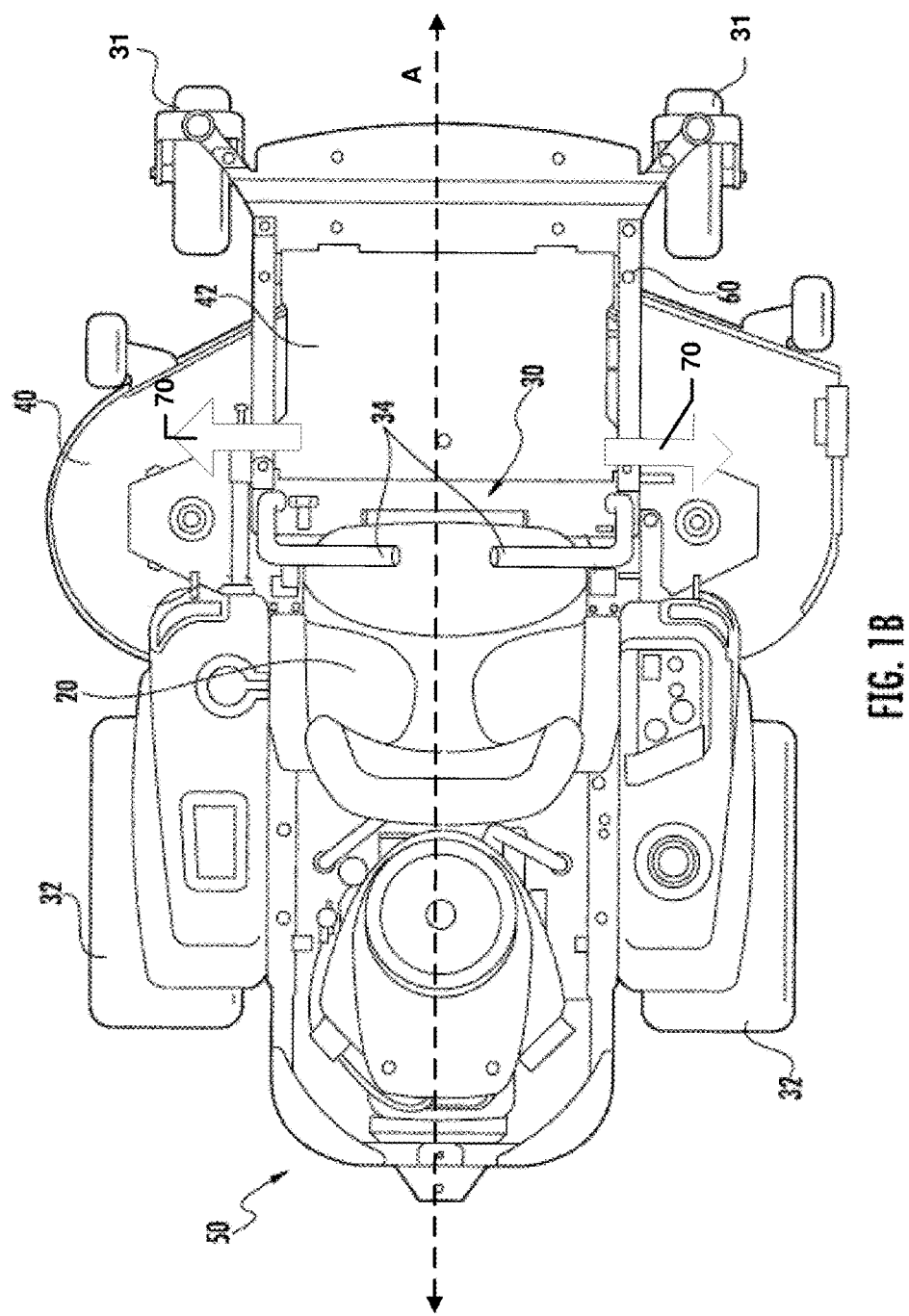
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10. The operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30.

In an example embodiment, the steering assembly 30 may include separately operable steering levers 34. The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. When a steering lever 34 is pushed forward (e.g., away from the operator), the corresponding hydraulic motor may drive the corresponding wheel forward. When a steering lever 34 is pulled rearward (e.g., toward the operator as shown by the directional arrows in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Figure 2:
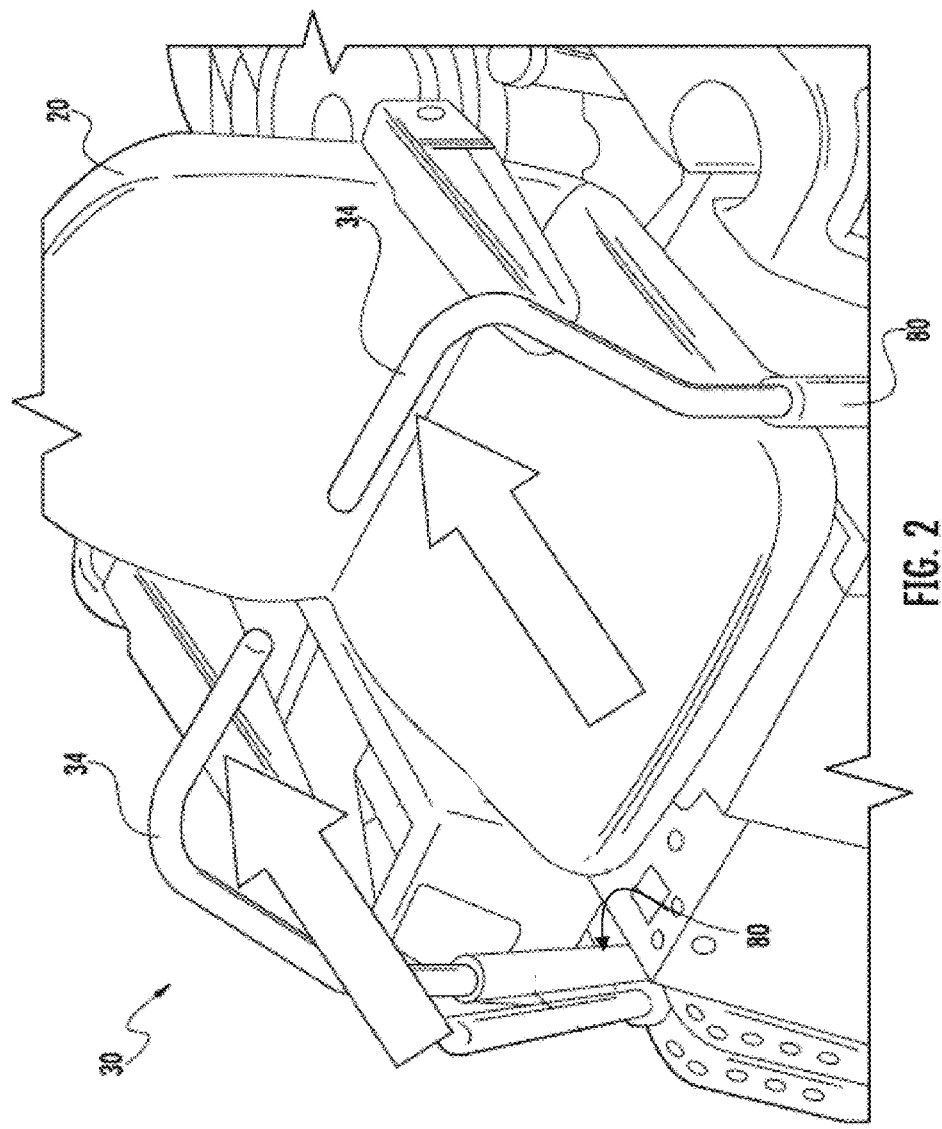
FIG. 2 illustrates a perspective view of a steering assembly with steering levers positioned to be pulled back for rearward propulsion according to an example embodiment.

Although the steering levers 34 are generally moved forward (i.e., opposite the direction of the arrows shown in FIG. 2) or backward (i.e., in the direction of the arrows shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one of the steering levers 34 is pivoted outwardly, the operator may easily mount or dismount the riding lawn care vehicle 10 and sit in or leave the seat 20.

In many conventional riding lawn care vehicles, a brake lever separate and distinct from the steering assembly is provided to interface with the brake assembly of the vehicle. In contrast, example embodiments of the present invention may provide for the setting of the brake assembly via one or more of the steering levers 34 of the steering assembly 30. For example, in some embodiments, the moving of only one of the steering levers 34 to the outboard position causes the brakes for all of the drive wheels (e.g., the rear wheels 32) to activate. Thus, rather than having to operate a separate brake lever to activate the brakes, or rather than having to activate separate brakes for each of the drive wheels, example embodiments may activate the entire brake assembly (e.g., the brakes for both drive wheels) when either of the steering levers 34 is moved outboard, independent of the position of the other one of the steering levers 34.

Figure 3:
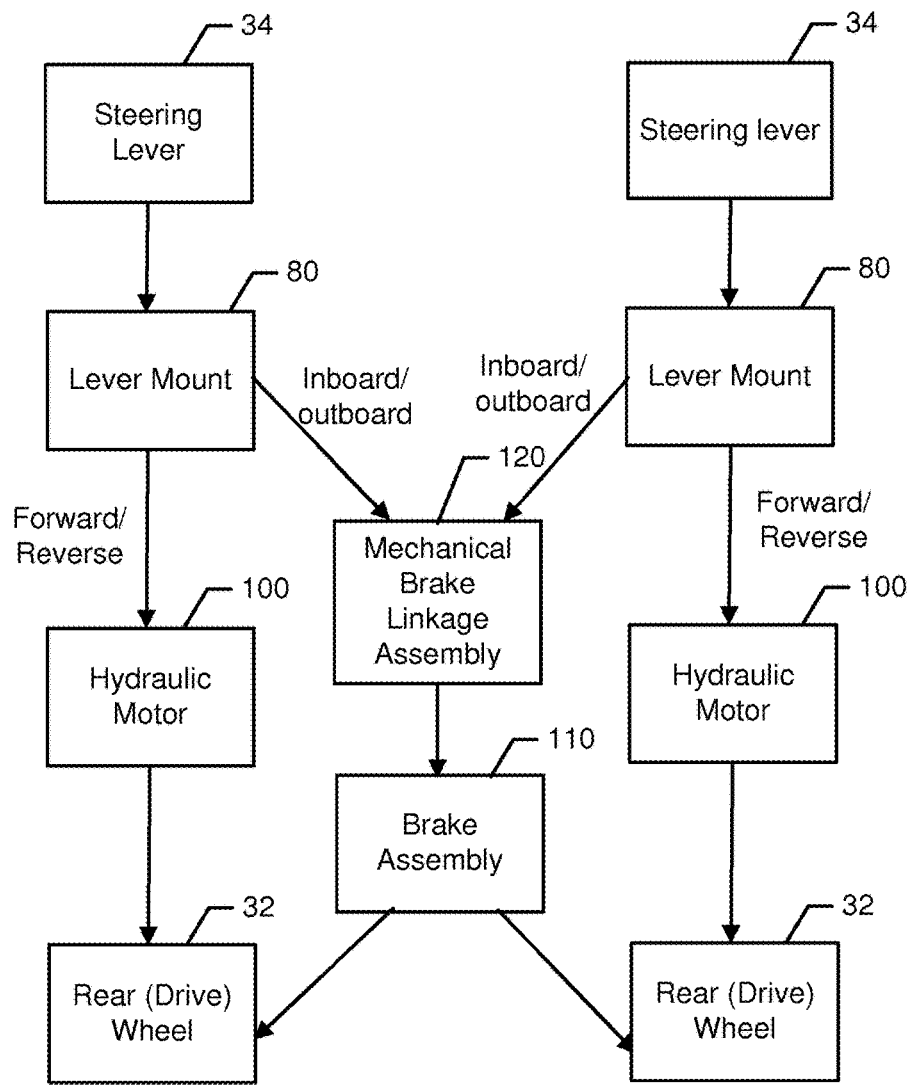
FIG. 3 illustrates a block diagram of some steering and braking components according to an example embodiment.

FIG. 3 illustrates a block diagram of some steering and braking components of an example embodiment. As shown in FIG. 3, each one of the steering levers 34 may be operably coupled to a corresponding one of the lever mounts 80. The lever mounts 80 may be operably coupled to corresponding hydraulic motors 100 that power respective ones of the drive wheels (e.g., the rear wheels 32). A brake system including a brake assembly 110 is also provided. However, as mentioned above, unlike a traditional system in which the brake assembly 110 is activated via a separate brake lever, the brake assembly 110 of an example embodiment activates brakes on both rear wheels 32 based on moving a position of the lever mount 80 and corresponding steering lever 34 of just one side (independent of the other) to the outboard position. Thus, while moving the lever mount 80 and corresponding steering lever 34 of either side in forward and reverse directions correspondingly operates the hydraulic motor 100 and drive wheel of the respective side, the movement of either lever mount 80 and corresponding steering lever 34 to the outboard position (e.g., moving the steering lever 34 outwardly and/or laterally away from the longitudinal centerline A of the riding lawn care vehicle 10) will engage and/or otherwise activate the brake assembly 110.

As shown in FIG. 3, a mechanical brake linkage assembly 120 is provided to operably couple both lever mounts 80 to the brake assembly 110. If one lever mount 80 is pivoted to the outboard position, the mechanical brake linkage assembly 120 operates to activate the brake assembly 110 so that brakes are applied at each of the rear wheels 32. In some embodiments, the brake assembly 110 may include a gear capable of locking the transaxle of each respective rear wheel 32, and a corresponding ratchet pawl may be engaged with the gear by the mechanical brake linkage assembly 120. If either one of the lever mounts 80 is moved to the outboard position, even if the other one of the lever mounts 80 remains in the inboard position, both rear wheels 32 will be locked via operation of the mechanical brake linkage assembly 120 to activate the brake assembly 110 by causing both gears to be engaged with their respective ratchet pawls using the structure described below.

Figure 4:
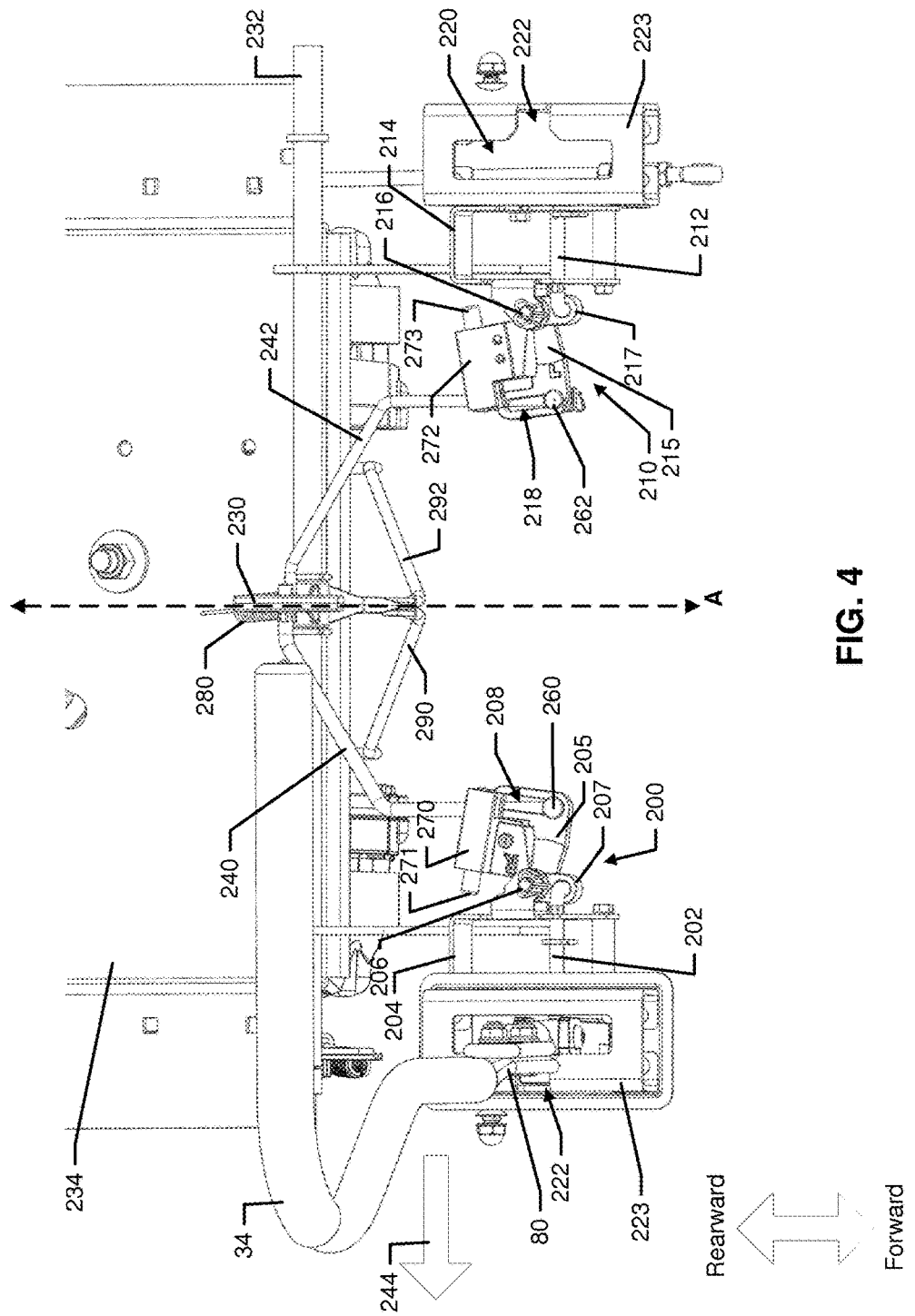
FIG. 4 illustrates an isolation view from the top to show some isolated components of a steering assembly along with a mechanical brake linkage assembly showing the interaction therebetween in accordance with an example embodiment.
Figure 5:
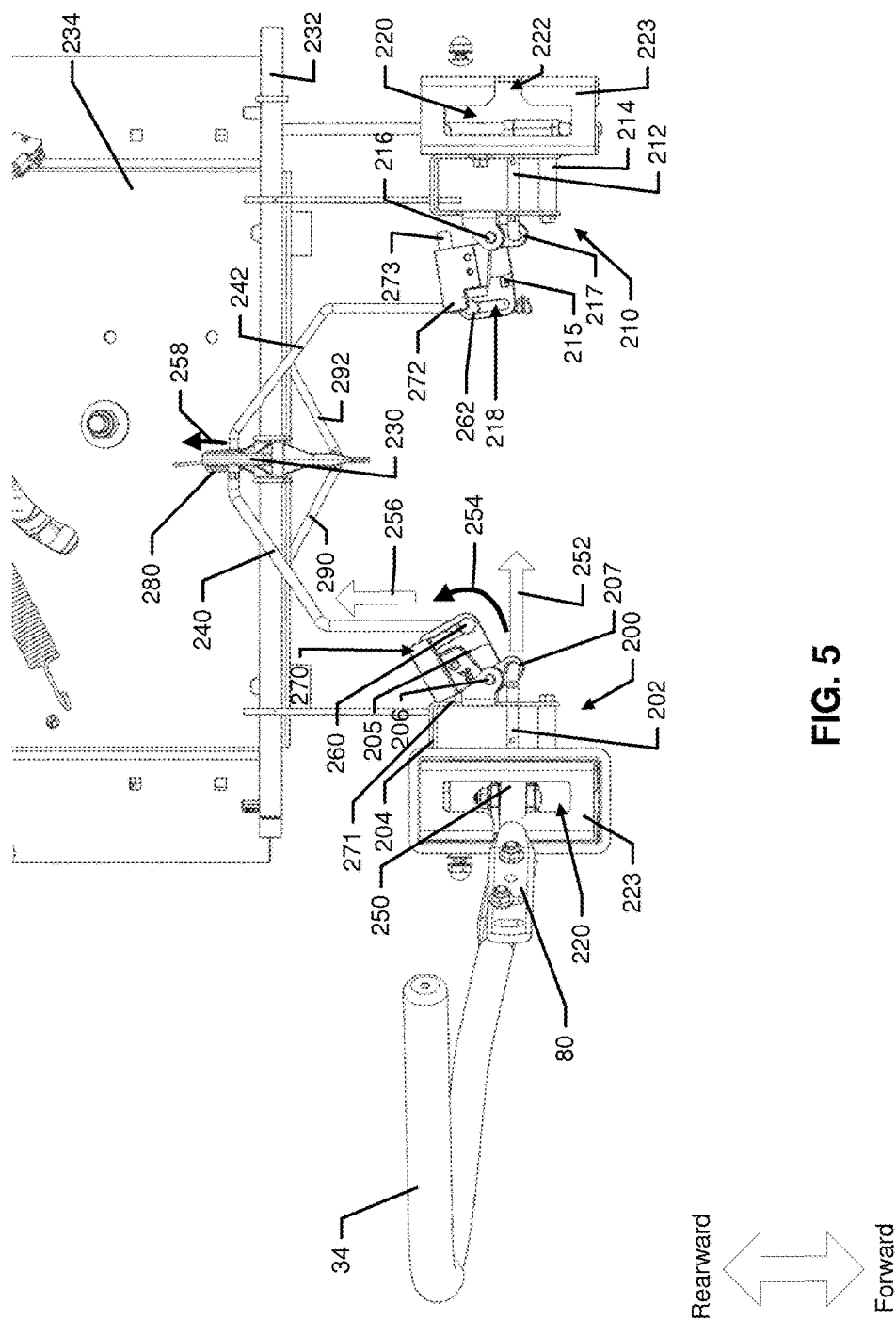
FIG. 5 shows the same isolation view of FIG. 4 after one steering lever is pivoted to an outboard position in accordance with an example embodiment.
Figure 6:
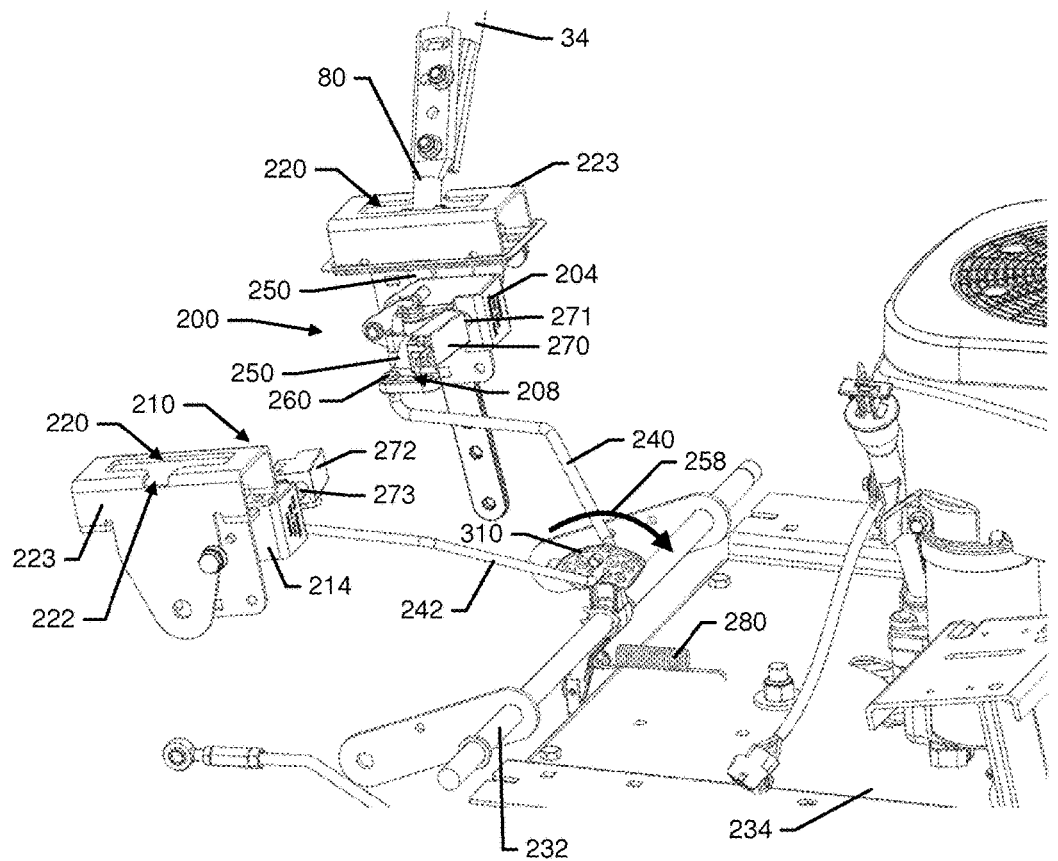
FIG. 6 illustrates a perspective view of some steering assembly and mechanical brake linkage assembly components in accordance with an example embodiment.
Figure 7:
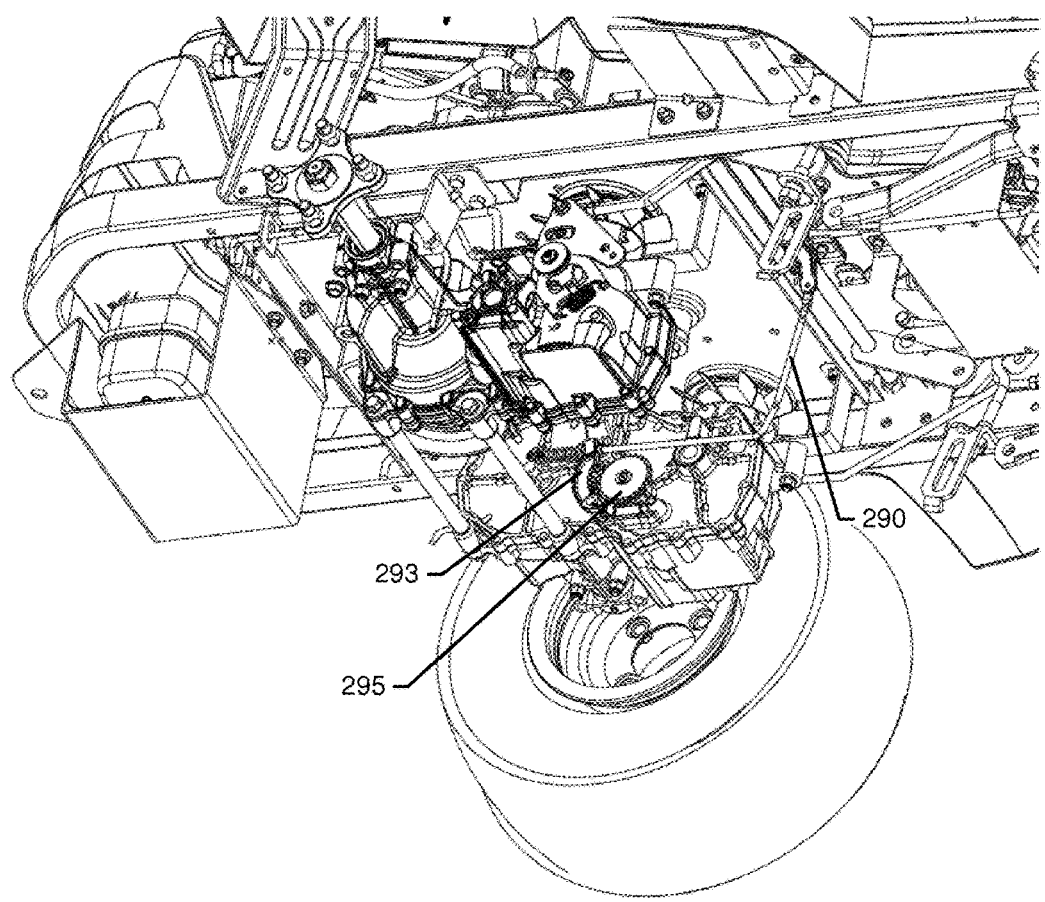
FIG. 7 illustrates a perspective view of an underside of the riding lawn care vehicle to show some components of the brake assembly thereof in accordance with an example embodiment.
Figure 8:
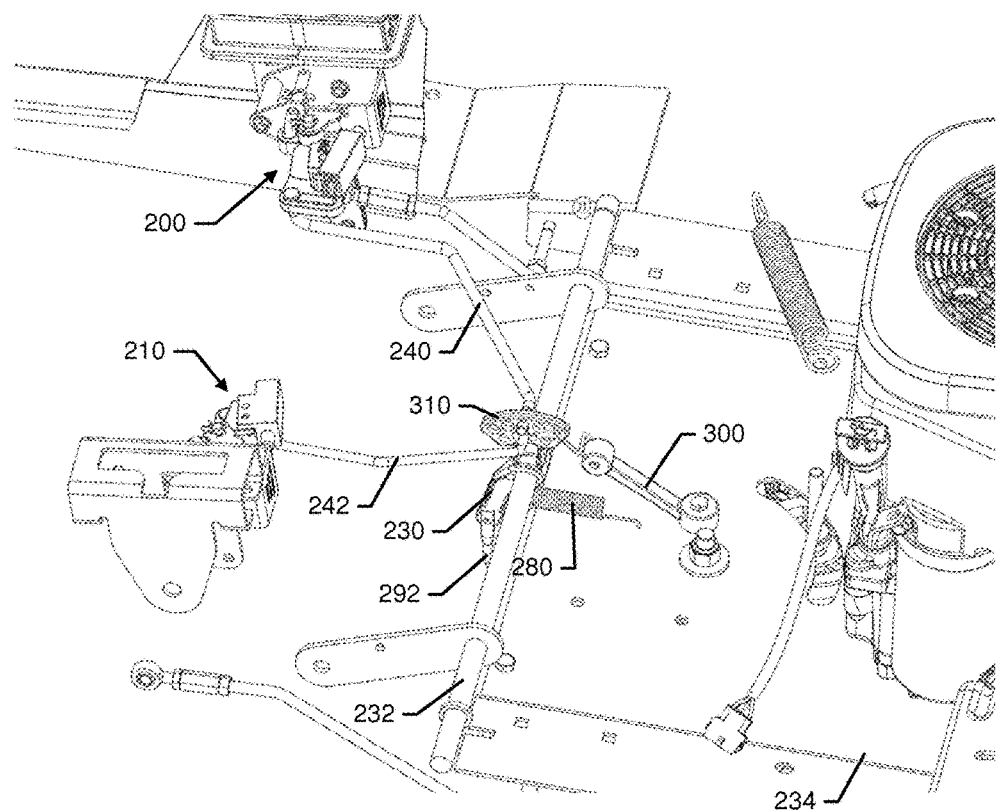
FIG. 8 illustrates a perspective view of some steering assembly and mechanical brake linkage assembly components in which a locking strap is further provided in accordance with an example embodiment.

FIGS. 4-8 illustrate more detailed views of some portions of the mechanical brake linkage assembly 120 to illustrate an example embodiment. In this regard, FIG. 4 illustrates an isolation view from the top to show some isolated components of the steering assembly 30 along with the mechanical brake linkage assembly 120 to show the interaction therebetween in accordance with an example embodiment. Of note, FIG. 4 illustrates a condition in which, although only one steering lever 34 is shown, both steering levers 34 are in the inboard (e.g., operational) position. FIG. 5 shows the same isolation view after the steering lever 34 shown is pivoted to the outboard (e.g., non-operational) position. FIG. 6 illustrates a perspective view that substantially corresponds to the situation provided in FIG. 5. FIG. 7 illustrates a perspective view of an underside of the riding lawn care vehicle 10 to show some components of the brake assembly 110 thereof in accordance with an example embodiment. FIG. 8 illustrates a perspective view in which a locking strap 300 is further provided in accordance with an example embodiment.

Referring now to FIGS. 4-8, the mechanical brake linkage assembly 120 is shown to include a first motion converter 200 and a second motion converter 210 that are each operably coupled to respective ones of the lever mounts 80. The lever mounts 80 may be movable in forward and reverse directions within respective guide slots 220 of housings 223 while the steering levers 34 are in the inboard (e.g., operational) position. The guide slots 220 may also be formed to enable movement (e.g., pivoting) of the lever mounts 80 outwardly to the outboard (e.g., non-operational) position. For example, each guide slot 220 may include an outward slot portion 222 that extends outwardly from the longitudinal centerline A of the riding lawn care vehicle 10, from the longitudinal centerline of the guide slot 220, from the midpoint of the guide slot 220, and/or from a location where the steering lever 34 is in a neutral position between a forward driving position and a backward driving position. In some embodiments, each guide slot 220 may be T-shaped as a result of its outward slot portion 222.

In an example embodiment, the first and second motion converters 200 and 210 are each also operably coupled to a third motion converter 230 via respective linkage bars that may be referred to as a first upper brake linkage 240 and a second upper brake linkage 242, respectively, which also form portions of the mechanical brake linkage assembly 120. The first upper brake linkage 240 may be operably coupled to the first motion converter 200 at one end thereof and may be operably coupled to the third motion converter 230 at an opposite end thereof. The second upper brake linkage 242 may be operably coupled to the second motion converter 210 at one end thereof and may be operably coupled to the third motion converter 230 at an opposite end thereof. The third motion converter 230 may be pivotally mounted on a shaft 232 that may be fixed relative to a portion of an engine plate 234 that supports the engine 50. The third motion converter 230 may be centrally located (e.g., proximate to the longitudinal centerline A of the riding lawn care vehicle 10) along the shaft 232 so that the first and second upper brake linkages 240 and 242 can be more similarly constructed as they will reach substantially the same distance inwardly from their respective locations spaced apart substantially equidistant from the longitudinal centerline A of the riding lawn care vehicle 10. In an example embodiment, the first and second upper brake linkages 240 and 242 may each have a number of bends along respective lengths thereof to move downward from the first and second motion converters 200 and 210, respectively, and also move rearward toward the third motion converter 230 while also moving inwardly toward the longitudinal centerline A of the riding lawn care vehicle 10.

In an example embodiment, each of the first, second, and third motion converters 200, 210, and 230 includes and/or is embodied as a bellcrank. Generally speaking, the first and second motion converters 200 and 210 are configured to convert pivotal motion in a plane that is substantially perpendicular to the longitudinal centerline A of the riding lawn care vehicle 10 into motion that extends forward or reverse or substantially parallel to the longitudinal centerline A of the riding lawn care vehicle 10. In this regard, as the lever mount 80 pivots from the inboard position shown in FIG. 4 in the direction shown by arrow 244 to the outboard position as shown in FIG. 5, a contact portion 250 of the lever mount 80 pivots inwardly as shown by arrow 252 to push rod 202 of the first motion converter 200 inwardly (i.e., also in the direction shown by arrow 252). In some embodiments, the rod 202 is housed at least partially within a motion converter base 204. Additionally or alternatively, the rod 202 is housed in the converter base 204 to enable the rod 202 to only move linearly either inwardly as shown by arrow 252 or in the opposite direction based on a position of the lever mount 80.

The converter base 204 may be a metallic and/or other rigid structure that may be fixed to a portion of the frame and/or body of the riding lawn care vehicle 10. In some cases, the converter base 204 may be fixed to a housing 223 (e.g., a socket) in which the guide slot 220 is formed. The converter base 204 may include a passage formed therein to guide movement of the rod 202 linearly in the inward and outward directions based on pivoting of the lever mount 80. The converter base 204 may also be operably coupled to a pivot body 205 that is pivotally attached to the converter base 204. The pivot body 205 may be pivotally mounted to the converter base 204 at a pivot axis 206 and may include a rod receiver portion 207 and a brake linkage reception slot 208. In an example embodiment, the pivot axis 206 may be disposed rearward of the rod receiver portion 207, and the brake linkage reception slot 208 may be provided substantially inwardly relative to the location of the pivot axis 206 and the rod receiver portion 207.

In an example embodiment, the distal end of the rod 202 may be operably coupled to the rod receiver portion 207 such that movement of the rod 202 causes corresponding rotation of the pivot body 205 about the pivot axis 206. In particular, for example, when the rod 202 is moved inwardly (as shown by arrow 252) due to pivoting of the lever mount 80, the pivot body 205 pivots in the direction shown by arrow 254. As the pivot body 205 pivots in the direction of arrow 254, a first end 260 of the first upper brake linkage 240 is carried rearward (in the direction of arrow 256) by virtue of the fact that the first end 260 of the first upper brake linkage 240 is already at the forward-most part of the brake linkage reception slot 208.

In some embodiments, the first motion converter 200 further includes an indicator switch 270 configured to indicate the position of the steering lever 34 and/or whether the drive wheel brakes are activated. In some cases, the indicator switch 270 may be activated (e.g., actuated, toggled, etc.) by movement of the pivot body 205. For example, in some embodiments, the indicator switch 270 is carried and/or mounted on the pivot body 205 and includes a push button 271. In such embodiments, the indicator switch 270 is configured to indicate (e.g., to the operator via a user interface) that the steering lever 34 is positioned in the outboard position (and/or that the drive wheel brakes are activated) when the push button 271 is at least partially depressed against the converter base 204 responsive to pivoting of the pivot body 205, which is itself caused by the steering lever 34 being moved to the outboard position. FIG. 4 shows an embodiment in which the push button 271 of the indicator switch 270 is not depressed but is instead biased outwardly by, e.g., a spring positioned within the indicator switch 270. FIG. 5 shows an embodiment in which the push button 271 is at least partially depressed against the converter base 204, which forces at least a portion of the push button 271 within the housing of the indicator switch 270 (e.g., by overcoming the restoring force of the spring) to activate the indicator switch 270.

The structure described above creates a situation in which the rod 202 moves to push the pivot body 205 to rotate about the pivot axis 206. However, it should be appreciated that the motion converter 200 could alternatively be structured to cause movement of the rod 202 to pull the pivot body 205 about the pivot axis 206 by placing the rod receiver portion 207 rearward of the pivot axis 206. In such an alternative structure, the upper and lower brake linkages may be configured to move in reverse directions and the third motion converter 230 may also rotate in the reverse direction to activate the brake assembly 110. Thus, it can be appreciated that the specific directions of motion described herein are applicable to the corresponding examples described. Yet other example structures and directions of movement can be employed that still fall within the spirit of that which is claimed and described herein.

Referring again to the example of FIGS. 4-8, when the first upper brake linkage 240 is carried or urged rearward (in the direction of arrow 256), the movement of the first upper brake linkage 240 causes corresponding rotation (e.g., pivoting) of the third motion converter 230 rearward in the direction of arrow 258. Rotation of the third motion converter 230 in the direction of arrow 258 overcomes the restoring force provided by a biasing member 280 (e.g., one or more springs) below a pivot axis of the third motion converter 230. The biasing member 280 may be fixed at one end to the engine plate 234 and fixed at the other end to a portion of the third motion converter 230 that is on an opposite side of the pivot axis relative to the side of the third motion converter 230 that contacts the first upper brake linkage 240 and the second upper brake linkage 242. Accordingly, as soon as the force rotating the third motion converter 230 in the direction of arrow 258 is removed, the biasing member 280 may act to rotate the third motion converter 230 in a direction opposite to the direction of arrow 258.

When the third motion converter 230 rotates in the direction of arrow 258, a first lower brake linkage 290 and a second lower brake linkage 292 are correspondingly moved forward to engage a pawl at the end of each respective one of the first and second lower brake linkages 290 and 292 with a corresponding gear that locks the transaxle associated with each respective rear wheel 32. In response to both steering levers 34 being moved to the inboard position, the biasing member 280 rotates the third motion converter 230 as described above, and the first lower brake linkage 290 and the second lower brake linkage 292 are each correspondingly moved rearward to disengage the pawl (e.g., pawl 293) at the end of each respective one of the first and second lower brake linkages 290 and 292 from the corresponding gear (e.g., gear 295) associated with each transaxle to unlock the transaxles and release the brakes associated with each respective rear wheel 32.

As mentioned above, only one of the steering levers 34 must be moved outwardly to activate the brake assembly 110 relative to both rear wheels 32. In particular, the structure of the mechanical brake linkage assembly 120 is configured to allow movement of one of the steering levers 34 to activate the brake assembly 110 relative to both rear wheels 32 independent of the position of the other steering lever 34. This structure is illustrated in particular by FIGS. 4-6 in that the structures described above relative to the first motion converter 200 are substantially mirrored on the second motion converter 210. In this regard, for example, the second motion converter 210 includes a second rod 212, a second converter base 214, a second pivot body 215, a second indicator switch 272 having a second push button 273, a second pivot axis 216, a second rod receiver portion 217, and a second brake linkage reception slot 218 that substantially mirror the first rod 202, the first converter base 204, the first pivot body 205, the first indicator switch 270 having the first push button 271, the first pivot axis 206, the first rod receiver portion 207, and the first brake linkage reception slot 208, respectively, described above. Also, the provision of the second brake linkage reception slot 218 on the second pivot body 215 enables the steering lever 34 and lever mount 80 on the other side (i.e., those shown in FIGS. 4-5) to be moved without impacting the other steering lever and lever mount. Similarly, the provision of the first brake linkage reception slot 208 on the first pivot body 205 enables the steering lever and lever mount on the other side (i.e., those not shown in FIGS. 4-5) to be moved without impacting the other steering lever 34 and lever mount 80.

Accordingly, during operation, the operator may move one of the steering levers 34 (e.g., the one shown in FIGS. 4-5) to the outboard position while the other steering lever (e.g., the one not shown in FIGS. 4-5) may remain in the inboard position. When the steering lever 34 moves in the direction of arrow 244, the lever mount 80 pivots to move the rod 202 in the direction of arrow 252 thereby pivoting the pivot body 205 in the direction of arrow 254. The first end 260 of the first upper brake linkage 240 is carried rearward (in the direction of arrow 256) by contact with the brake linkage reception slot 208 to move the first upper brake linkage 240 in the direction of arrow 256 and pivot the third motion converter 230 in the direction of arrow 258. Pivoting of the third motion converter 230 in the direction of arrow 258 causes forward movement of the first and second lower brake linkages 290 and 292 to engage corresponding pawls with respective gears that locks the transaxles associated with each respective rear wheel 32.

In some embodiments, when the pivot body 205 rotates about the pivot axis 206 in the direction of arrow 254 to move the first upper brake linkage 240 rearward in the direction of arrow 256 and to pivot the third motion converter 230 in the direction of arrow 258, the second upper brake linkage 242 is also carried rearward. However, in some of these embodiments, the rod 212, the pivot body 215, and/or the rod receiver portion 217 of the second motion converter 210 are not moved as a result of this action such that the steering lever 34 on the corresponding side remains in the inboard position. Instead, when the second upper brake linkage 242 is carried rearward, the first end 262 of the second upper brake linkage 242 is allowed to slide within the second brake linkage reception slot 218 of the second motion converter 210 without causing the second pivot body 215 of the second motion converter 210 to pivot. It should be noted however, that the steering lever 34 on the corresponding side could also be pivoted to the outboard position and the brake assembly 110 would still be activated. Also, it should be noted that, in some embodiments, the first pivot axis 206 of the first pivot body 205 extends in a direction that is substantially perpendicular to the longitudinal centerline A of the riding lawn care vehicle 10 and/or substantially parallel to the second pivot axis 216 of the second pivot body 215.

In some example embodiments, the first upper brake linkage 240 and the second upper brake linkage 242 may not be identical in size, and therefore may not be exactly symmetrical. In this regard, for example, the first upper brake linkage 240 and the second upper brake linkage 242 may have different diameters (e.g., ¼ inch versus ⁵⁄₁₆ inch). In some cases, the different sizes of the first upper brake linkage 240 and the second upper brake linkage 242 may be useful, for example, where the first upper brake linkage 240 and the second upper brake linkage 242 engage the third motion converter 230 at different locations (e.g., at and/or through different apertures in the third motion converter 230).

The provision of a mechanism by which to activate the brake assembly 110 to the drive wheels (e.g., both rear wheels 32) via operation of a single steering lever 34 may make it relatively easy and intuitive for operators to control application of parking brakes for starting operations, dismounting, transporting, and/or other activities for which it is desirable to apply brakes to both transaxles. However, in some cases, it may further be desirable to provide a mechanism by which to further secure the application of the brake assembly 110. For example, when transporting the riding lawn care vehicle 10, bouncing or other sudden movements could inadvertently result in the steering lever 34 being moved inwardly (e.g., from the outboard position to the inboard position), thereby unintentionally unlocking the brake assembly 110 during transport. Accordingly, in some cases, a locking mechanism is provided to lock the third motion converter 230.

FIG. 8 illustrates one embodiment in which a locking strap 300 can be provided to prevent any accidental brake release during transport. In this regard, as shown in FIG. 8, the locking strap 300 may be fixed (or fixable) at one end thereof to the engine plate 234. Given that the locking strap 300 is used to lock the third motion converter 230, which is located proximate to the longitudinal centerline A of the riding lawn care vehicle 10, the locking strap 300 may also be fixable to the engine plate 234 proximate to the longitudinal centerline A of the riding lawn care vehicle 10. The opposite end of the locking strap 300 may include a hook or other such structure that can be alternately attached to or removed from the third motion converter 230. In some embodiments, the third motion converter 230 may include a mounting plate 310 with a plurality of apertures therein. The first and second upper brake linkages 240 and 242 may be attachable to selected respective ones of these apertures and the locking strap 300 may also be connected to one of the apertures. The locking strap 300 may be an elastic strap that can be stretched to engage to the mounting plate 310 and then securely hold the third motion converter 230 in the rearward direction, thereby preventing forward movement of the mounting plate 310. The first and second lower mounting brackets 290 and 292 may therefore be correspondingly held such that the pawls stay engaged with the corresponding gears of the brake assembly 110 to keep the brake assembly 110 engaged.

Accordingly, some example embodiments may enable movement of a single steering lever to control the application of a parking brake or other brake assembly to both drive wheels of a mower such as a zero turn mower. In an example embodiment, a riding lawn care vehicle may therefore be provided. The vehicle may include a frame, a steering assembly, a brake assembly, and a mechanical brake linkage assembly. At least a first drive wheel and a second drive wheel of the riding lawn care vehicle may be attachable to the frame. The steering assembly may include first and second steering levers operably coupled to the first and second drive wheels respectively to facilitate turning of the riding lawn care vehicle based on drive speed control of the first and second drive wheels responsive to positioning of the first and second steering levers. The brake assembly may be operably coupled to the first and second drive wheels to enable brakes to be selectively applied to the first and second drive wheels. The mechanical brake linkage assembly may be configured to activate the brake assembly relative to the first and second drive wheels in response to one of the first steering lever or the second steering lever being moved outwardly to an outboard position independent of a position of the other of the first steering lever or the second steering lever.

The riding lawn care vehicle (or mechanical brake linkage assembly) of some embodiments may include additional features that may be optionally added either alone or in combination with each other. For example, in some embodiments, (1) the mechanical brake linkage assembly may be configured to enable the first steering lever to be pivoted to the outboard position to engage a corresponding pawl and gear associated with each of the first and second drive wheels to lock a transaxle of each of the first and second drive wheels while the second steering lever remains inboard. In some cases, (2) the first steering lever and the second steering lever may be operably coupled to the first and second drive wheels of the riding lawn care vehicle via a first lever mount and a second lever mount, respectively. Meanwhile, the first and second lever mounts may be pivotable between an operating (e.g., inboard) position and the outboard position. In an example embodiment, (3) the mechanical brake linkage assembly may include a first motion converter, a second motion converter, and a third motion converter. The first motion converter may operably couple the first lever mount to the brake assembly via a first upper brake linkage and the third motion converter. The second motion converter may operably couple the second lever mount to the brake assembly via a second upper brake linkage and the third motion converter. In some examples, (4) the first motion converter and the second motion converter each include respective instances of a rod configured to move responsive to pivoting of a respective one of the first lever mount or the second lever mount, and a pivot body having a brake linkage reception slot. In such an example, inward motion of the rod of one of the first or second motion converters may cause the pivot body to rotate to urge a corresponding one of the first or second upper brake linkages to move the third motion converter and the other one of the first or second upper brake linkages. The other one of the first or second upper brake linkages may slide within the brake linkage reception slot of the other of the first or second motion converters without moving the other of the first or second motion converters.

In some embodiments, any or all of (1) to (5) may be employed in addition to the optional modifications or augmentations described below. For example, in some embodiments, the rod pushes or pulls the pivot body to rotate the pivot body about a pivot axis. Additionally or alternatively, the third motion converter may be disposed proximate to the longitudinal centerline of the riding lawn care vehicle on a rotatable shaft. In such an example, the third motion converter may be coupled to the first and second upper brake linkages at a mounting plate disposed on one side of the rotatable shaft. In some cases, the third motion converter may be coupled to first and second lower brake linkages at an opposite side of the rotatable shaft relative to the mounting plate, and the first and second lower brake linkages may be operably coupled to the brake assembly. Additionally or alternatively, each of the first, second, and third motion converters may include and/or be embodied as a bellcrank. Additionally or alternatively, the mechanical brake linkage assembly may further include a locking member configured to enable the third motion converter to be locked in a position that activates the brake assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
a frame to which at least a first drive wheel and a second drive wheel of the riding lawn care vehicle are attachable;
a steering assembly comprising a first steering lever and a second steering lever, wherein the first and second steering levers are operably coupled to the first and second drive wheels via a first lever mount and a second lever mount, respectively, to facilitate turning of the riding lawn care vehicle based on drive speed control of the first and second drive wheels responsive to positioning of the first and second steering levers, and wherein the first and second lever mounts are pivotable between an operating position and an outboard position;
a brake assembly operably coupled to the first and second drive wheels to enable brakes to be selectively applied to the first and second drive wheels; and
a mechanical brake linkage assembly configured to activate the brake assembly relative to the first and second drive wheels in response to one of the first steering lever or the second steering lever being moved outwardly to the outboard position independent of a position of the other of the first steering lever or the second steering lever,
wherein the mechanical brake linkage assembly comprises a first motion converter, a second motion converter, and a third motion converter,
wherein the first motion converter operably couples the first lever mount to the brake assembly via a first upper brake linkage and the third motion converter,
wherein the second motion converter operably couples the second lever mount to the brake assembly via a second upper brake linkage and the third motion converter, wherein the third motion converter is disposed proximate to a longitudinal centerline of the riding lawn care vehicle on a rotatable shaft, wherein the third motion converter is coupled to the first and second upper brake linkages at a mounting plate disposed on one side of the rotatable shaft, and wherein the third motion converter is coupled to first and second lower brake linkages at an opposite side of the rotatable shaft relative to the mounting plate, the first and second lower brake linkages being operably coupled to the brake assembly.

2. The riding lawn care vehicle of claim 1, wherein the mechanical brake linkage assembly is configured to enable the first steering lever to be pivoted to the outboard position to engage a corresponding pawl and gear associated with each of the first and second drive wheels to lock a transaxle of each of the first and second drive wheels while the second steering lever remains in an inboard position.

3. The riding lawn care vehicle of claim 1, wherein the first motion converter comprises a first rod and a first pivot body, the first rod being configured to move responsive to pivoting of the first lever mount, and the first pivot body comprising a first brake linkage reception slot, wherein the second motion converter comprises a second rod and a second pivot body, the second rod being configured to move responsive to pivoting of the second lever mount, and the second pivot body comprising a second brake linkage reception slot, and wherein inward motion of the first rod causes the first pivot body to pivot to urge the first upper brake linkage to move the third motion converter and the second upper brake linkage, thereby causing a portion of the second upper brake linkage to slide within the second brake linkage reception slot without pivoting the second pivot body.

4. The riding lawn care vehicle of claim 3, wherein the first rod is configured to move linearly in a direction substantially perpendicular to the longitudinal centerline of the riding lawn care vehicle responsive to pivoting of the first lever mount to pivot the first pivot body and move the first and second upper brake linkages in a direction substantially parallel to the longitudinal centerline of the riding lawn care vehicle.

5. The riding lawn care vehicle of claim 3, wherein movement of the first rod pushes or pulls the first pivot body to rotate the first pivot body about a pivot axis.

6. The riding lawn care vehicle of claim 3, wherein the first motion converter further comprises:
a converter base that at least partially houses the first rod; and
an indicator switch carried on the first pivot body and comprising a push button, wherein the indicator switch is configured to indicate that the first steering lever is positioned in the outboard position when the push button is at least partially depressed against the first converter base responsive to pivoting of the first pivot body.

7. The riding lawn care vehicle of claim 1, wherein each of the first, second, and third motion converters comprises a bellcrank.

8. The riding lawn care vehicle of claim 1, further comprising a locking member configured to enable the third motion converter to be locked in a position that activates the brake assembly.

9. The riding lawn care vehicle of claim 1, wherein the riding lawn care vehicle is a zero turn mower.

10. A mechanical brake linkage assembly of a riding lawn care vehicle, wherein the riding lawn care vehicle further comprises first and second drive wheels, first and second steering levers, and a brake assembly, wherein the brake assembly is operably coupled to the first and second drive wheels to enable brakes to be selectively applied to the first and second drive wheels, wherein the first steering lever is operably coupled to the first drive wheel via a first lever mount and the second steering lever is operably coupled to the second drive wheel via a second lever mount, the first and second lever mounts being pivotable between an operating position and an outboard position, and wherein the riding lawn care vehicle is steerable via the first and second steering levers to facilitate turning of the riding lawn care vehicle based on drive speed control of the first and second drive wheels responsive to positioning of the first and second steering levers, wherein the mechanical brake linkage assembly is operably coupled to the brake assembly and is configured to activate the brake assembly relative to the first and second drive wheels in response to one of the first steering lever or the second steering lever being moved outwardly to the outboard position independent of a position of the other of the first steering lever or the second steering lever, wherein the mechanical brake linkage assembly comprises a first motion converter, a second motion converter, and a third motion converter, wherein the first motion converter operably couples the first lever mount to the brake assembly via a first upper brake linkage and the third motion converter, wherein the second motion converter operably couples the second lever mount to the brake assembly via a second upper brake linkage and the third motion converter, wherein the third motion converter is disposed proximate to a longitudinal centerline of the riding lawn care vehicle on a rotatable shaft, wherein the third motion converter is coupled to the first and second upper brake linkages at a mounting plate disposed on one side of the rotatable shaft, and wherein the third motion converter is coupled to first and second lower brake linkages at an opposite side of the rotatable shaft relative to the mounting plate, the first and second lower brake linkages being operably coupled to the brake assembly.

11. The mechanical brake linkage assembly of claim 10, wherein the mechanical brake linkage assembly is configured to enable the first steering lever to be pivoted to the outboard position to engage a corresponding pawl and gear associated with each of the first and second drive wheels to lock a transaxle of each of the first and second drive wheels while the second steering lever remains in an inboard position.

12. The mechanical brake linkage assembly of claim 10, wherein the first motion converter comprises a first rod and a first pivot body, the first rod being configured to move responsive to pivoting of the first lever mount, and the first pivot body comprising a first brake linkage reception slot, wherein the second motion converter comprises a second rod and a second pivot body, the second rod being configured to move responsive to pivoting of the second lever mount, and the second pivot body comprising a second brake linkage reception slot, and wherein inward motion of the first rod causes the first pivot body to pivot to urge the first upper brake linkage to move the third motion converter and the second upper brake linkage, thereby causing a portion of the second upper brake linkage to slide within the second brake linkage reception slot without pivoting the second pivot body.

13. The mechanical brake linkage assembly of claim 12, wherein the first rod is configured to move linearly in a direction substantially perpendicular to the longitudinal centerline of the riding lawn care vehicle responsive to pivoting of the first lever mount to pivot the first pivot body and move the first and second upper brake linkages in a direction substantially parallel to the longitudinal centerline of the riding lawn care vehicle.

14. The mechanical brake linkage assembly of claim 12, wherein movement of the first rod pushes or pulls the first pivot body to rotate the first pivot body about a pivot axis.

* * * * *